US010587173B2

(12) United States Patent
Takahashi et al.

(10) Patent No.: US 10,587,173 B2
(45) Date of Patent: Mar. 10, 2020

(54) CORE FOR ROTARY ELECTRIC MACHINE AND METHOD OF MANUFACTURING THE SAME

(71) Applicant: HONDA MOTOR CO., LTD., Minato-ku, Tokyo (JP)

(72) Inventors: Tadanobu Takahashi, Utsunomiya (JP); Kengo Ohira, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 65 days.

(21) Appl. No.: 15/892,490

(22) Filed: Feb. 9, 2018

(65) Prior Publication Data
US 2018/0233997 A1     Aug. 16, 2018

(30) Foreign Application Priority Data

Feb. 16, 2017  (JP) .................................. 2017-27221

(51) Int. Cl.
*H02K 15/02* (2006.01)
*H02K 1/02* (2006.01)
*H02K 1/16* (2006.01)

(52) U.S. Cl.
CPC ............. *H02K 15/024* (2013.01); *H02K 1/02* (2013.01); *H02K 1/16* (2013.01)

(58) Field of Classification Search
CPC ........... H02K 15/024; H02K 1/02; H02K 1/16
USPC .................................................. 310/216.004
See application file for complete search history.

(56) References Cited

U.S. PATENT DOCUMENTS

| 2007/0170806 A1* | 7/2007 | Haldemann | H02K 1/16 310/216.045 |
| 2008/0238237 A1* | 10/2008 | Nishihama | H02K 1/06 310/166 |
| 2018/0191208 A1* | 7/2018 | Kubo | H02K 1/04 |

FOREIGN PATENT DOCUMENTS

| CN | 101494396 | 7/2009 |
| JP | 2004-140966 | 5/2004 |
| JP | 2006-200030 | 8/2006 |
| JP | 2010-220324 | 9/2010 |
| JP | 2015-136831 | 7/2015 |
| WO | 2017/126423 | 7/2017 |

OTHER PUBLICATIONS

Translation of foreign Patent document JP 2010220324 A (Year: 2010).*
Translation of foreign Patent document JP 2015136831 A (Year: 2015).*
Japanese Office Action for Japanese Patent Application No. 2017-027221 dated Jul. 3, 2018.
Chinese Office Action for Chinese Patent Application No. 201810131745.X dated Jul. 3, 2019.

* cited by examiner

*Primary Examiner* — Alex W Mok
(74) *Attorney, Agent, or Firm* — Amin, Turocy & Watson, LLP

(57) ABSTRACT

The present invention is a core for a rotary electric machine comprising a stacked body where a plurality of shaping layers formed by solidifying a metal powder is integrally stacked.

14 Claims, 10 Drawing Sheets

CORE FOR ROTARY ELECTRIC MACHINE AND METHOD OF MANUFACTURING THE SAME

CROSS-REFERENCE TO RELATED APPLICATION

Priority is claimed on Japanese Patent Application No. 2017-27221, filed Feb. 16, 2017, the content of which is incorporated herein by reference.

BACKGROUND OF THE INVENTION

Field of the Invention

The present invention relates to a core for a rotary electric machine and a method of manufacturing the same.

Description of Related Art

In general, a core (a stator core or a rotor core) used in a rotary electric machine is configured by stacking a plurality of core members in an axial direction of the rotary electric machine (for example, see Japanese Unexamined Patent Application, First Publication No. 2004-140966). Each of the core members is formed by, for example, punching an electromagnetic steel sheet.

SUMMARY OF THE INVENTION

However, in the above-mentioned core in the related art, because a punching mold is used to form the core members and the core members are stacked through caulking, adhesion, or the like, there is room for improvement in reducing costs and improving manufacturing efficiency, the degree of design freedom, and so on.

In consideration of the above-mentioned problems, an aspect according to the present invention is to provide a core for a rotary electric machine and a method of manufacturing the same that are capable of reducing costs and improving manufacturing efficiency, the degree of design freedom, and the like.

(1) In order to accomplish the above-mentioned object, a core for a rotary electric machine according to an aspect of the present invention is comprising a stacked body where a plurality of shaping layers formed by solidifying a metal powder is integrally stacked.

(2) In the aspect of (1), a slit passing through the stacked body in a stacking direction of the shaping layers may be formed in the stacked body.

(3) In the aspect of (1) or (2), the stacked body may have: core members formed to follow an exterior shape of the stacked body when seen in a plan view in the stacking direction of the shaping layers; and connecting portions formed to be smaller than an exterior shape of the stacked body when seen in a plan view in the stacking direction and configured to integrally connect the core members in a state in which a gap is provided between the core members that are adjacent to each other.

(4) In the aspect of (3), the connecting portions disposed at both sides in the stacking direction of the core member are set so as not to overlap each other when seen in the stacking direction.

(5) In the aspect of any one of (1) to (4), the metal powder may be pure iron.

(6) In the aspect of any one of (1) to (5), the stacked body may be a stator core.

(7) In the aspect of any one of (1) to (6), the stacked body may have: a tubular back yoke portion; and tooth portions which protrude from the back yoke portion and on which a coil is mounted, wherein a plurality of slits passing through the back yoke portion in an axial direction is formed in the tooth portions at intervals in a circumferential direction of the back yoke portion.

(8) A method of manufacturing a core for a rotary electric machine according to an aspect of the present invention includes repeatedly performing a first shaping layer forming process of forming a first shaping layer by solidifying a metal powder; and a second shaping layer forming process of forming a second shaping layer on the first shaping layer by solidifying the metal powder supplied onto the first shaping layer.

According to the aspects of (1) and (8), since the configuration in which the stacked body is obtained by integrally stacking the plurality of shaping layers formed by solidifying the metal powder is provided, the aspects are different from the configuration in which the core member is formed by punching an electromagnetic steel sheet like the related art, and there is no need to provide a punching mold. For this reason, cost reduction and prompt delivery become possible.

Moreover, since the shaping layer (the core member) can be formed by solidifying the metal powder, a shape of the core for a rotary electric machine (the stacked body) can be freely designed in comparison with the case in which the punched core members are stacked. Accordingly, the degree of design freedom can be increased.

Since the shaping layers can be formed by solidifying the metal powder, the shaping layers can be sequentially stacked while the shaping layers are coupled. Accordingly, unlike the case in which the core member is formed of the electromagnetic steel sheet, there is no need to separately connect the shaping layers (through caulking, adhesion, or the like). For this reason, further improvement of manufacturing efficiency can be achieved.

Further, variation of the shape can be suppressed in comparison with the case in which the core members are formed of the electromagnetic steel sheet. Accordingly, when the core for a rotary electric machine is manufactured, there is no need to stack the core members to prevent torque nonuniformity while transposing the core members. Accordingly, the manufacturing efficiency of the core for a rotary electric machine can be further increased while suppressing torque nonuniformity.

According to the aspect of (2), current paths of an eddy current generated in the core for a rotary electric machine by input and output of a magnetic flux due to driving of the core for a rotary electric machine can be divided (insulated) by the slits.

Accordingly, eddy current loss in the core for a rotary electric machine can be reduced. Accordingly, iron loss (a sum of eddy current loss and hysteresis loss) of the core for a rotary electric machine can be reduced.

According to the aspect of (3), the core members that are adjacent to each other in the axial direction are connected by the connecting portion in a state in which a gap is provided. For this reason, the current paths of the eddy current generated in the core for a rotary electric machine by the input and output of the magnetic flux due to driving of the core for a rotary electric machine can be divided (insulated) by the gaps. That is, the eddy current can be suppressed from flowing throughout the core members that are adjacent to each other in the axial direction. Accordingly, eddy current loss in the core for a rotary electric machine can be reduced.

According to the aspect of (4), for example, in comparison with the case in which the connecting portions that are adjacent to each other in the axial direction are formed at positions that overlap when seen in a plan view, the current path of the eddy current flowing through the core members that are adjacent to each other through the connecting portion can be lengthened. Accordingly, eddy current loss can be further reduced.

According to the aspect of (5), since the metal powder is formed of pure iron, hysteresis loss can be reduced in comparison with the case in which the stacked body is manufactured of an electromagnetic steel sheet.

Accordingly, iron loss can be further reduced.

According to the aspect of (6), restrictions in manufacture such as strength or the like are less in the stator core that is a non-rotating body than, for example, in the rotor that is a rotating body. For this reason, as the core for a rotary electric machine of the present invention is applied to the stator core, further improvement of the degree of design freedom or manufacturing efficiency can be achieved.

According to the aspect of (7), since the slits are formed in the tooth portions having a high magnetic flux density, eddy current loss in the core for a rotary electric machine can be securely reduced. Accordingly, iron loss (the sum of eddy current loss and hysteresis loss) in the core for a rotary electric machine can be reduced.

DETAILED DESCRIPTION OF THE INVENTION

Next, an embodiment of the present invention will be described with reference to the accompanying drawings. In the embodiment, the case in which a core for a rotary electric machine according to the present invention is applied to a stator core will be described.

[Rotary Electric Machine]

Figure 1:
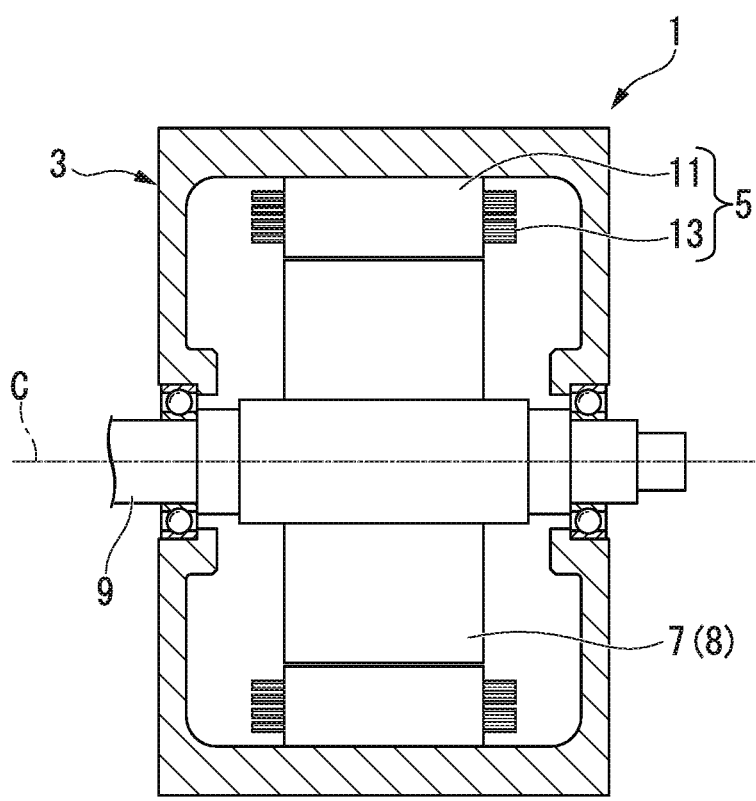
FIG. 1 is a schematic cross-sectional view showing the entire configuration of a rotary electric machine including a stator core according to an embodiment.

FIG. 1 is a schematic cross-sectional view showing the entire configuration of a rotary electric machine 1 including a stator core (a core for a rotary electric machine, a stacked body) 11 according to the embodiment.

The rotary electric machine 1 shown in FIG. 1 is a traction motor mounted in a vehicle (for example, a hybrid automobile, an electric automobile, or the like). However, the rotary electric machine 1 is also applicable to a generator or a motor for another purpose. The rotary electric machine 1 may be mounted on an apparatus other than a vehicle.

The rotary electric machine 1 includes a case 3, a stator 5, a rotor 7 and an output shaft 9.

The output shaft 9 is rotatably supported in the case 3. Further, in the following description, a direction along an axis C of the output shaft 9 may be simply referred to as an axial direction, a direction perpendicular to the axis C may be referred to as a radial direction, and a direction around the axis C may be referred to as a circumferential direction.

The rotor 7 has a rotor core (a core for a rotary electric machine, a stacked body) 8 and a magnet (not shown) attached to the rotor core 8. The rotor core 8 is formed in a tubular shape fitted onto the output shaft 9.

The stator 5 includes the stator core 11 and a coil 13 mounted on the stator core 11.

<Stator Core>

Figure 2:
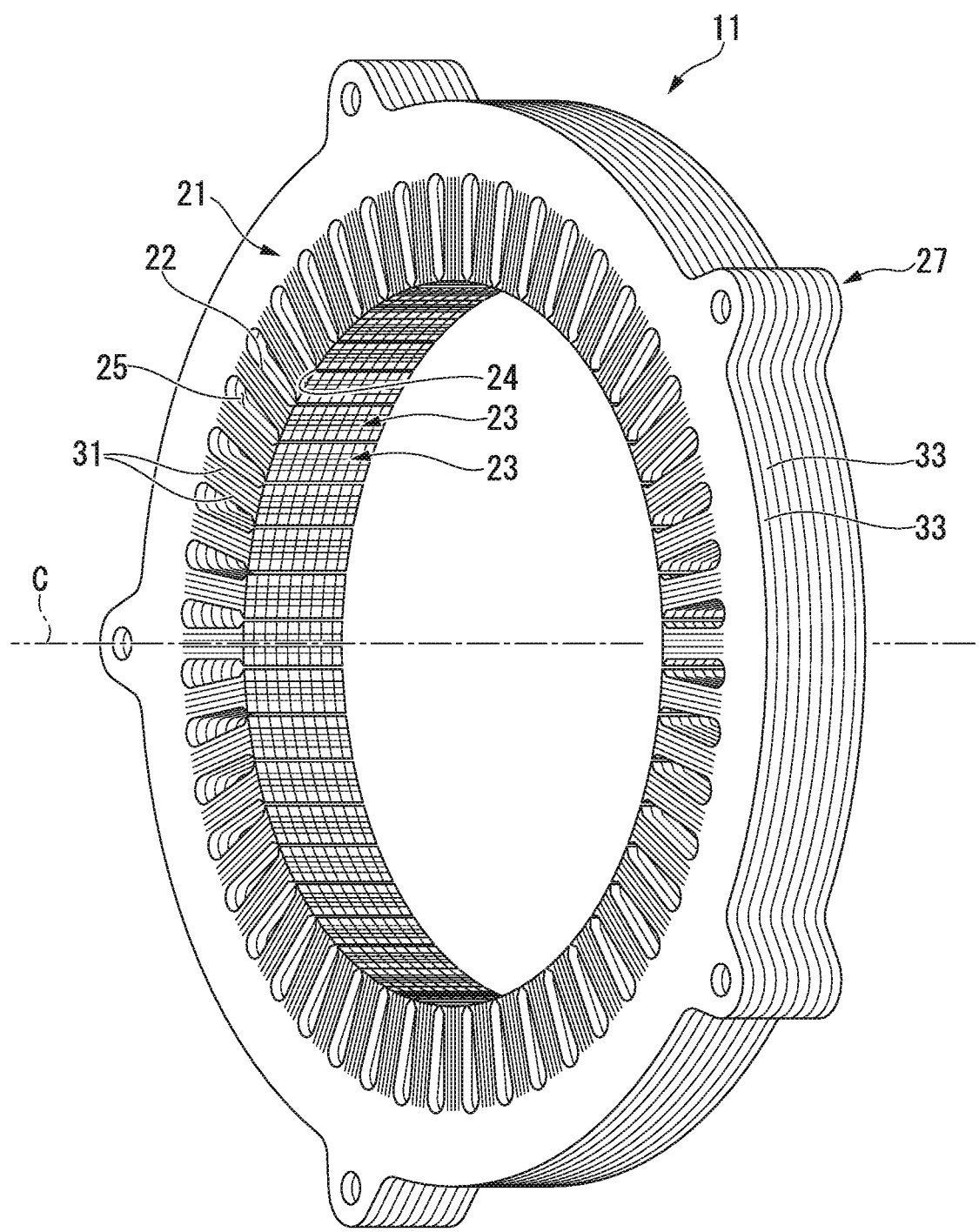
FIG. 2 is a perspective view of a stator core according to the embodiment.

FIG. 2 is a perspective view of the stator core 11.

As shown in FIG. 2, the stator core 11 is formed in a tubular shape that surrounds the above-mentioned rotor 7 (see FIG. 1) from the outside in a radial direction. The stator core 11 is fixed in the case 3 (see FIG. 1).

The stator core 11 has a back yoke portion 21 and a plurality of tooth portions 23.

The back yoke portion 21 is formed in a tubular shape disposed coaxially with the axis C. An attachment boss 27 protruding outward in the radial direction is formed on an outer circumferential surface of the back yoke portion 21. The stator core 11 is fixed to the case 3 via the attachment boss 27. Further, in the example of FIG. 2, the plurality of attachment bosses 27 are formed in a circumferential direction at intervals.

Figure 3:
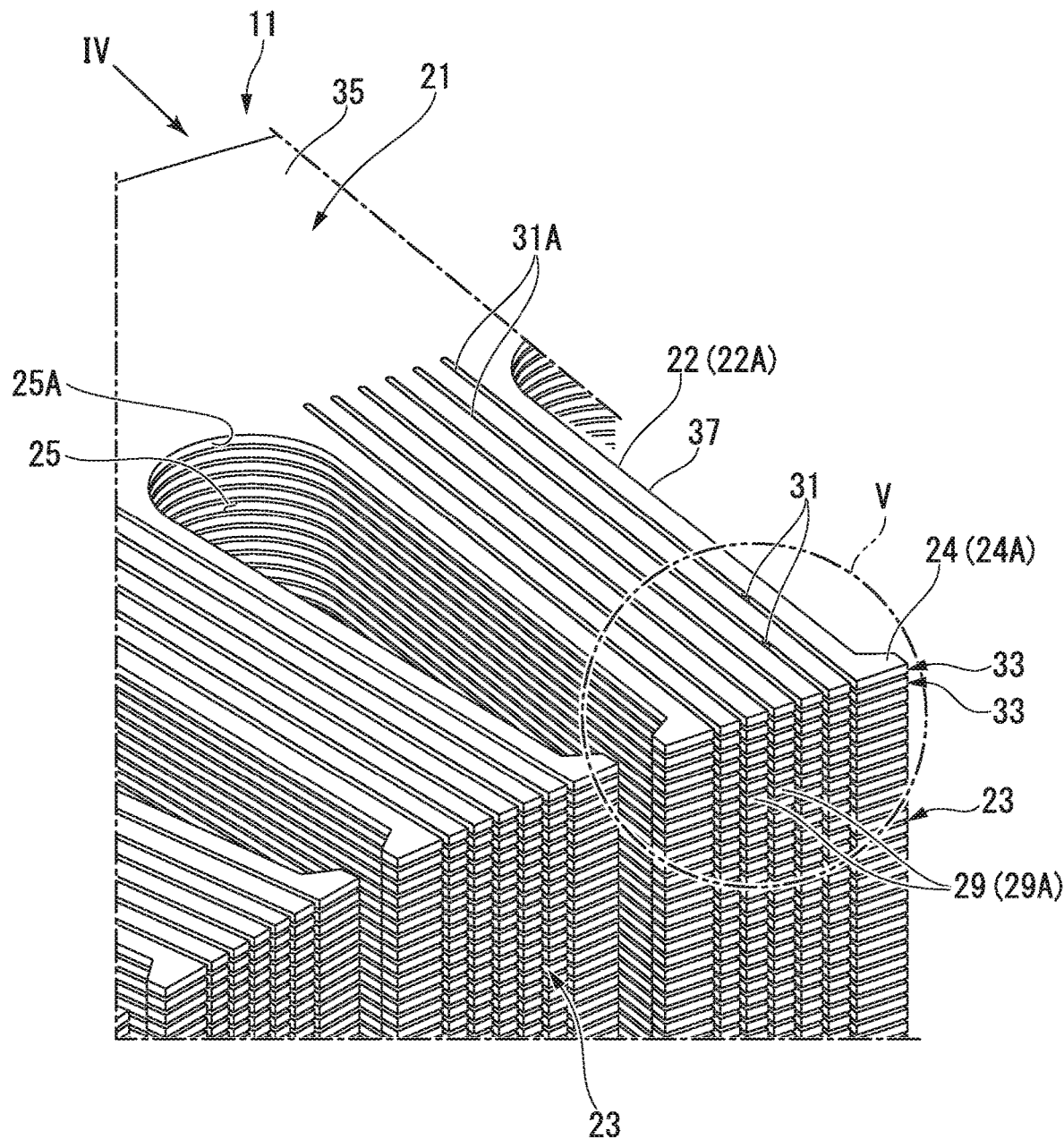
FIG. 3 is a partial perspective view of the stator core according to the embodiment.

FIG. 3 is a partial perspective view of the stator core 11.

As shown in FIG. 3, the tooth portions 23 protrude inward from an inner circumferential surface of the back yoke portion 21 in the radial direction. The plurality tooth portions 23 are formed in the circumferential direction at intervals. Each of the tooth portions 23 includes coil mounting portions 22 extending in the radial direction, and expansion portions 24 expanding from an inner end portion of the coil mounting portions 22 in the radial direction toward both sides in the circumferential direction.

Slots 25 through which the coil 13 is inserted are formed between the tooth portions 23 that are adjacent to each other in the circumferential direction. That is, the slots 25 pass through the stator core 11 in an axial direction. The coil 13 is a 3-phase coil constituted by a U phase, a V phase and a W phase. Further, the configuration of the coil 13 can be appropriately changed. For example, the coil 13 may have a configuration in which a winding is wound on the tooth portions 23, and may have a configuration in which U-shaped segment coils are inserted into the slots 25. The coil 13 may be distributed windings or may be a concentrated winding.

A plurality of slits 31 are formed in the above-mentioned tooth portions 23. The slits 31 are formed in the tooth portions 23 in the circumferential direction at intervals (for example, equal intervals). The slits 31 extend in the radial direction and pass through the tooth portions 23 in the axial direction. Inner end portions of the slits 31 in the radial direction open in inner end surfaces of the tooth portions 23 in the radial direction. Meanwhile, outer end portions of the slits 31 in the radial direction terminate at boundary portions between the tooth portions 23 and the back yoke portion 21. Further, the number, ranges, or the like, of the slits 31 can be appropriately changed. For example, the inner end portions of the slits 31 in the radial direction may terminate at the tooth portions 23.

The tooth portions 23 are divided into a plurality of tooth split portions 29 in the circumferential direction by the slits 31. In the embodiment, in the portions disposed in the coil mounting portions 22, widths in the circumferential direction and thicknesses in the axial direction are equal between the tooth split portions 29.

Figure 4:
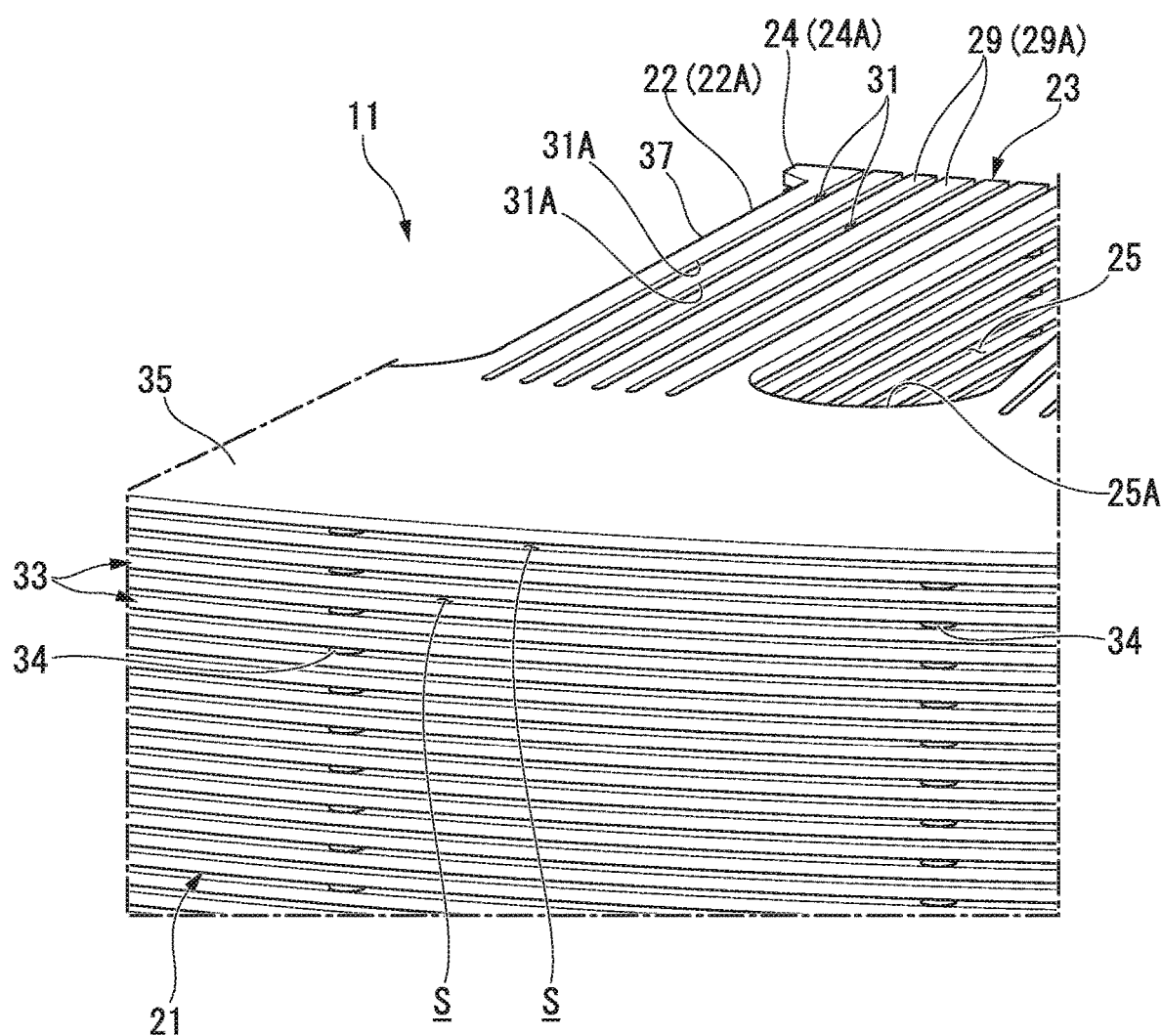
FIG. 4 is a view taken along an arrow IV in FIG. 3.

FIG. 4 is a view taken along an arrow IV in FIG. 3.

Here, as shown in FIG. 4, the stator core 11 of the embodiment includes a plurality of core members 33 arranged in the axial direction, and connecting portions 34 configured to connect the core members 33 that are adjacent to each other in the axial direction. The stator core 11 is configured such that the core members 33 and the connecting portions 34 are alternately stacked on each other in the axial direction.

The core members 33 are formed by melting and solidifying a metal powder (for example, pure iron or the like). The core members 33 are formed to follow a shape in a plan view when the stator core 11 is seen in the axial direction. That is, each of the core members 33 has a back yoke piece 35 and tooth pieces 37. Further, in the following description, portions of the core members 33 corresponding to the above-mentioned stator core 11 are expressed by adding "A" to the same reference numerals as the stator core 11, and detailed description thereof will be omitted. That is, like the above-mentioned stator core 11, each of the core members 33 has coil mounting portions 22A, expansion portions 24A, slots 25A, tooth split portions 29A and slits 31A.

Figure 5:
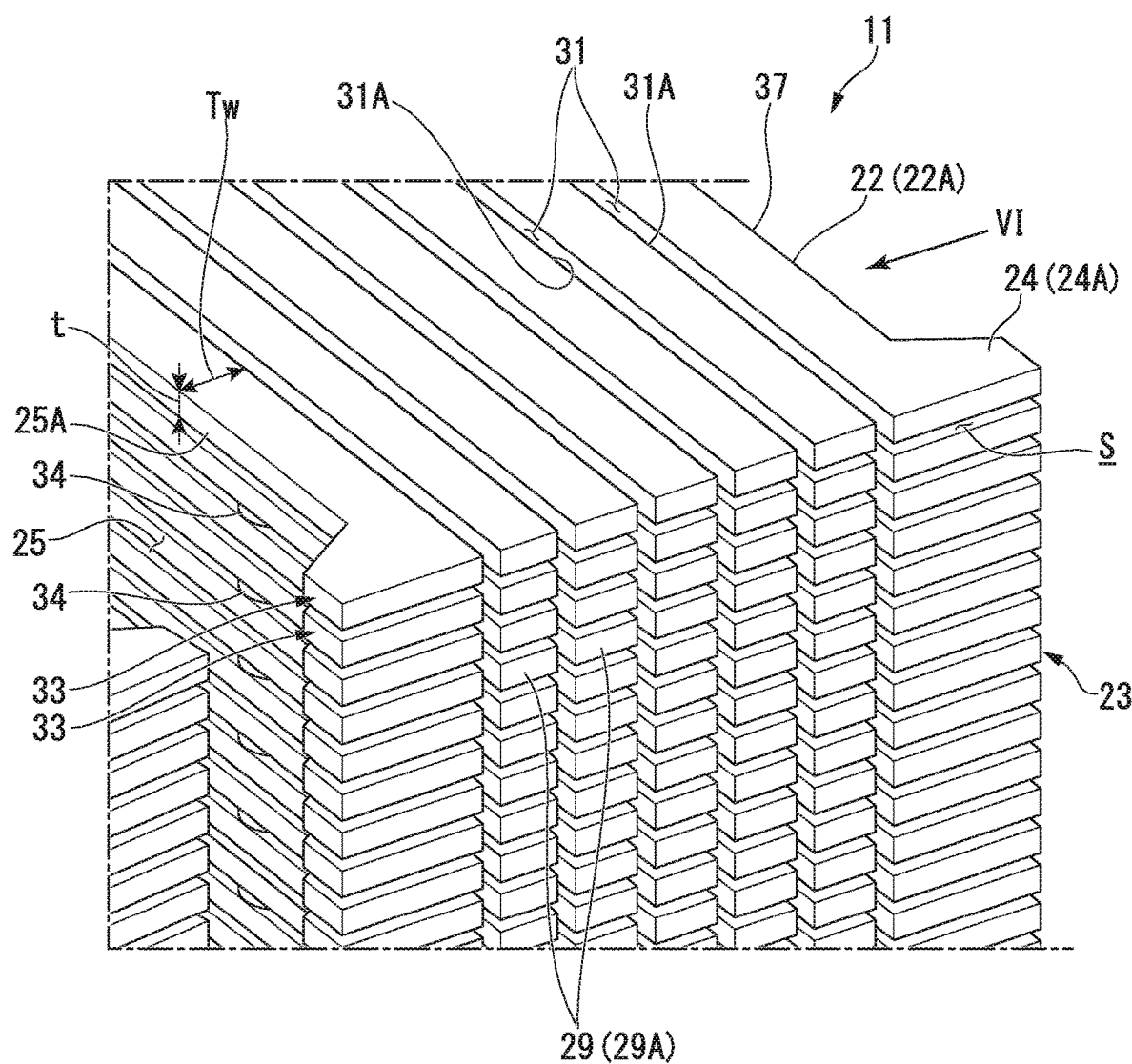
FIG. 5 is an enlarged perspective view of a portion V in FIG. 3.
Figure 14:
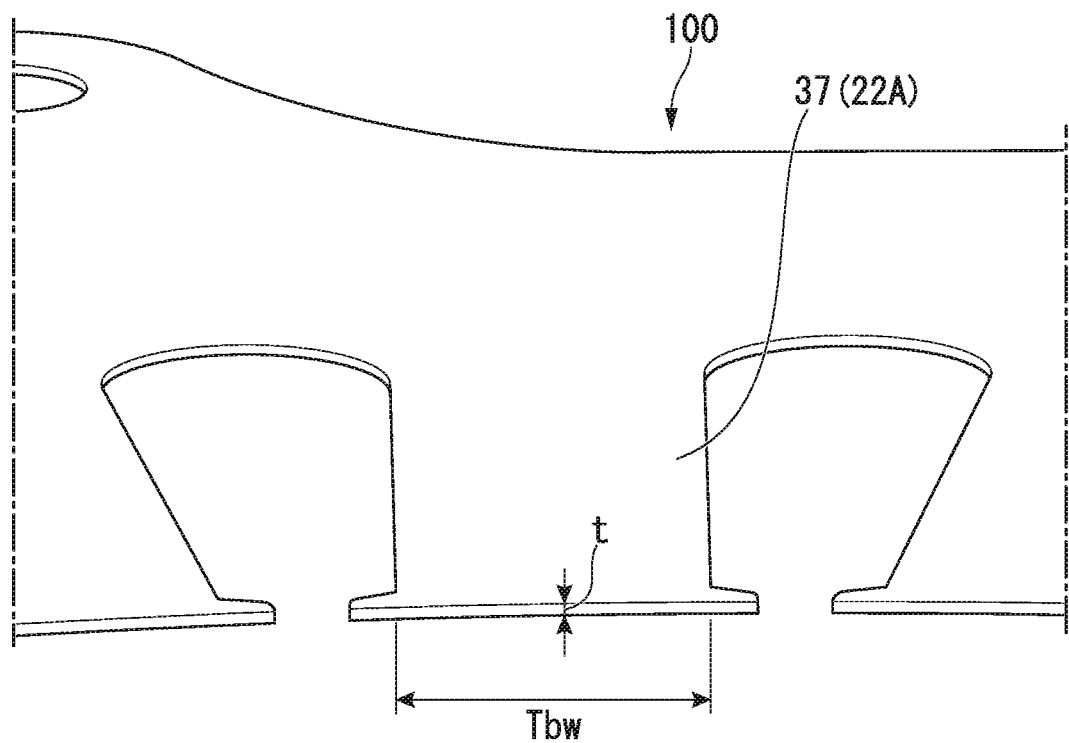
FIG. 14 is a perspective view showing a core member in which no slit is formed.

FIG. 5 is an enlarged perspective view of a portion V in FIG. 3. FIG. 14 is a perspective view showing a core member 100 in which the slits 31 are not formed. Further, portions of the core member 100 shown in FIG. 14 corresponding to the core member 33 of the embodiment are designated by the same reference numerals as the core member 33, and a description thereof will be omitted.

In the embodiment, in the tooth piece 37 shown in FIG. 5, a circumferential length P1 of the coil mounting portion 22A (a sum of circumferential lengths of the portions of the tooth split portions 29A disposed on the coil mounting portions 22A) is set to a circumferential length P2 or more of the coil mounting portion 22A of the tooth piece 37 in which the slits 31 shown in FIG. 14 are not formed.

Specifically, the circumferential length P1 of the coil mounting portion 22A in the core member 33 shown in FIG. 5 is expressed by the following equation.

$$P1 = (t + Tw) \times 2 \times n$$

t: a length (a thickness) of the tooth piece 37 in the axial direction

Tw: a length of a portion of each of the tooth split portions 29A disposed on the coil mounting portion 22A in the circumferential direction n: the number of the tooth split portions 29A The circumferential length P2 of the coil mounting portion 22A in the core member 100 shown in FIG. 14 is expressed by the following equation.

$$P2 = (t + Tbw) \times 2$$

t: a thickness of the tooth piece 37 (the coil mounting portion 22A)

Figure 6:
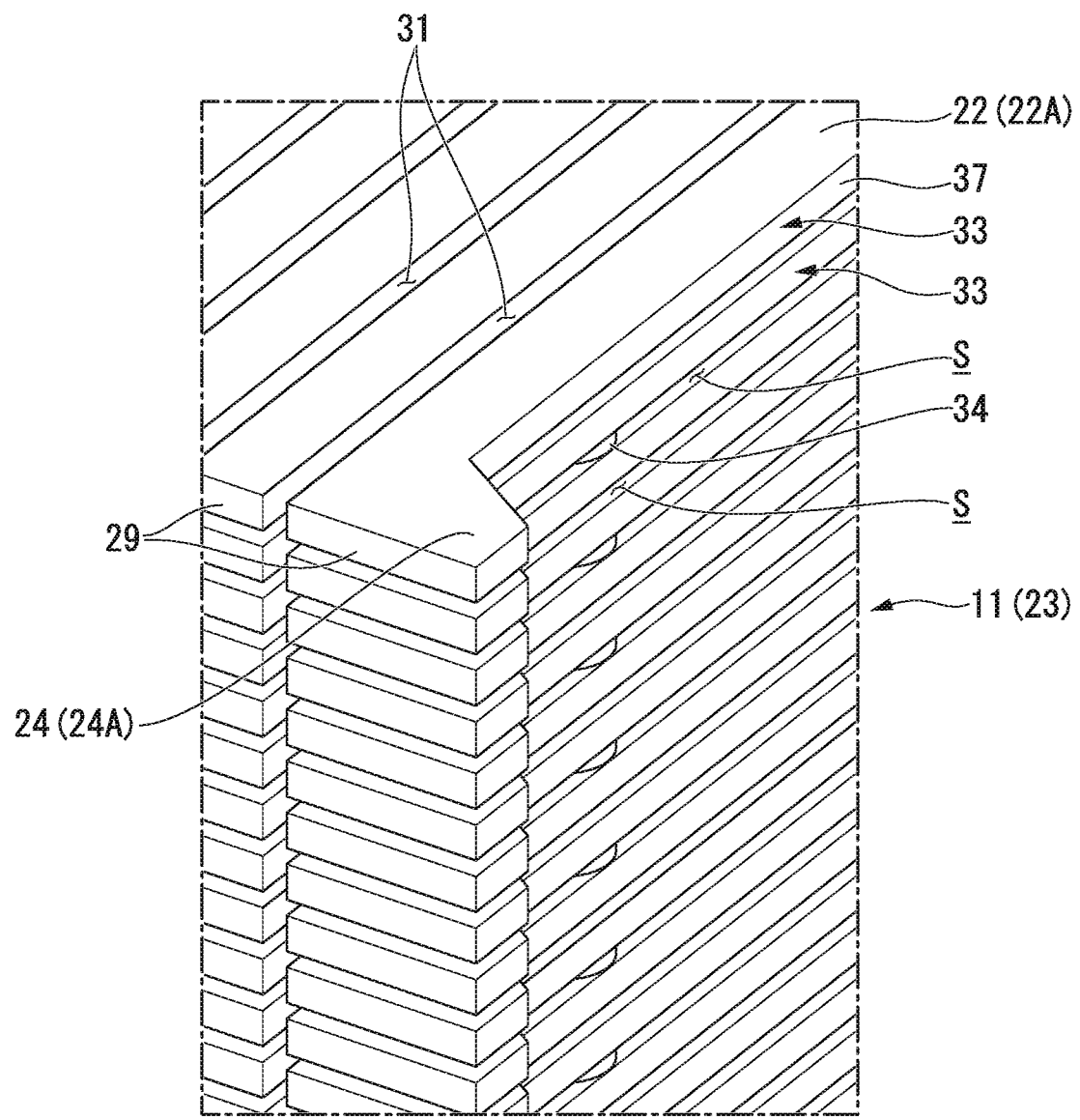
FIG. 6 is a view taken along an arrow VI in FIG. 5.

Tbw: a length of the coil mounting portion 22A in the circumferential direction FIG. 6 is a view taken along an arrow VI in FIG. 5.

As shown in FIGS. 4 and 6, the connecting portion 34 connects the core members 33 that are adjacent to each other in the axial direction. The connecting portion 34 is formed by melting and solidifying a metal powder. The connecting portion 34 is formed in a columnar shape extending in the axial direction. The connecting portions 34 are disposed on portions of the core members 33 corresponding to the back yoke pieces 35 or the tooth pieces 37 (the tooth split portions 29A) at appropriate intervals. Accordingly, the core members 33 that are adjacent to each other in the axial direction are formed integrally with each other via the connecting portion 34 in a state in which a gap S to an extent of a thickness of the connecting portion 34 is provided. Further, a shape of each connecting portion 34 in a plan view is sufficiently smaller than an exterior of the stator core 11 (the core member 33) in a plan view.

Here, in the embodiment, the connecting portions 34 disposed at both sides in the axial direction of the core member 33 are set so as not to overlap each other when seen in the axial direction. In the embodiment, the connecting portion 34 that does not overlap the connecting portion 34 in a plan view and the connecting portion 34 that overlaps the connecting portion 34 in a plan view are disposed alternately (in a zigzag pattern) in the axial direction. However, the layout, the number, or the like, of the arranged connecting portions 34 may be appropriately changed.

<Method of Manufacturing Stator Core>

Next, a method of manufacturing the above-mentioned stator core 11 will be described. FIGS. 7 to 12 are process views showing the method of manufacturing the stator core 11.

The stator core 11 of the embodiment may be manufactured using a so-called 3D printer. That is, in the 3D printer, a powder layer 53 (see FIG. 7) to which a metal powder is supplied in a layer shape is selectively melted and solidified on the basis of cross section data of the stator core 11. After that, in the 3D printer, as shaping layers 54 and 56 (see FIGS. 8, 10, and so on) formed by melting and solidifying the powder layer 53 are sequentially stacked, the stator core 11 is formed by a stacked body of the shaping layers 54 and 56.

In the method of manufacturing the stator core 11 of the embodiment, a core member forming process and a connecting portion forming process are performed alternately.

Figure 7:
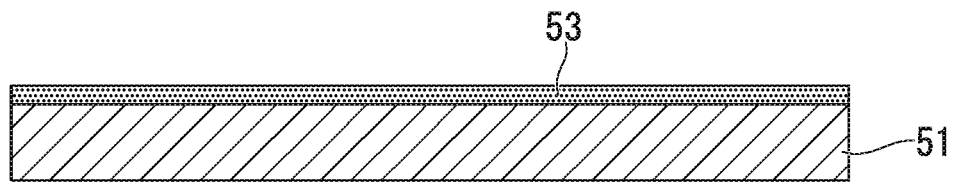
FIG. 7 is a process view showing a method of manufacturing a stator core according to the embodiment.
Figure 8:
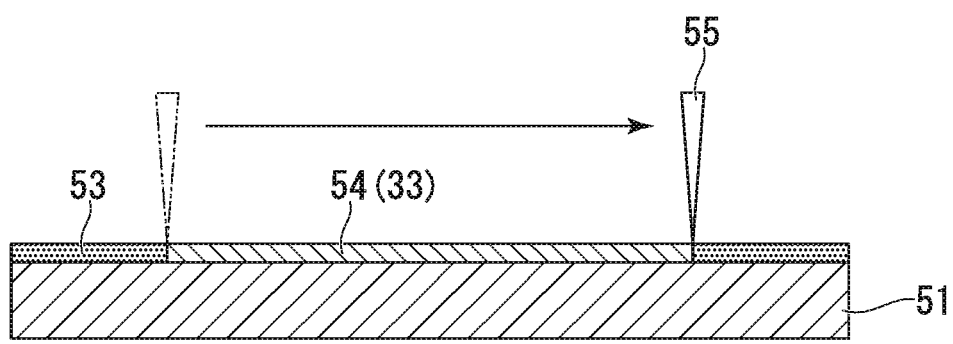
FIG. 8 is a process view showing the method of manufacturing the stator core according to the embodiment.

As shown in FIG. 7, in the core member forming process, after a first metal powder is first supplied onto a shaping tray 51, the metal powder is flattened to form the powder layer 53. Next, as shown in FIG. 8, the powder layer 53 is scanned by a laser 55 and a portion of the powder layer 53 that becomes the core member 33 is irradiated with the laser 55. Then, a portion of the powder layer 53 irradiated with the laser 55 is melted. As the melted portion of the powder layer 53 is solidified, the core member shaping layer 54 is formed (a first shaping layer forming process). After that, as the core member shaping layers 54 are sequentially stacked by the same method as the above-mentioned method (a second shaping layer forming process), the core members 33 are formed. Further, the number of stacked core member shaping layers 54 that constitute the core member 33 of one layer may be appropriately changed.

Figure 9:
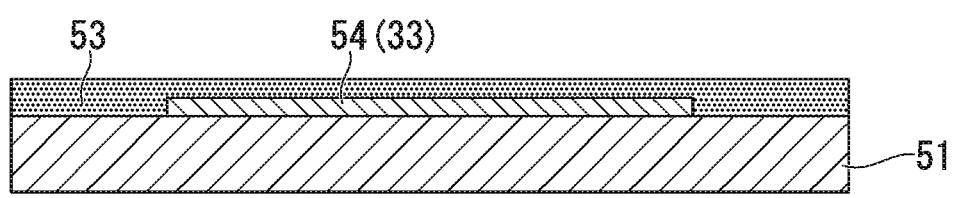
FIG. 9 is a process view showing the method of manufacturing the stator core according to the embodiment.
Figure 10:
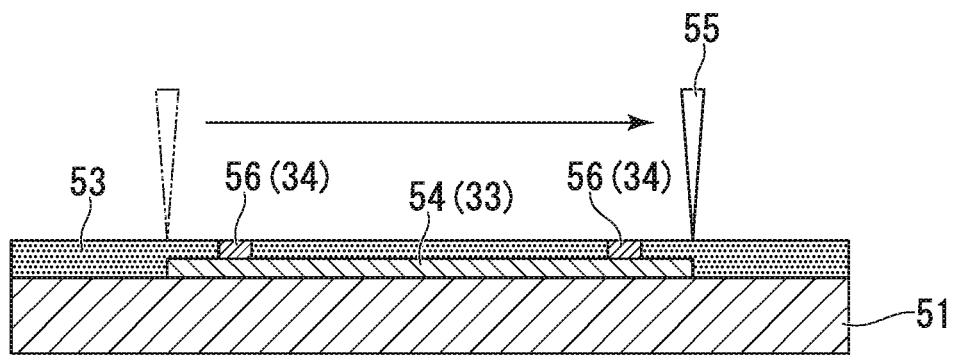
FIG. 10 is a process view showing the method of manufacturing the stator core according to the embodiment.

Next, in the connecting portion forming process, as shown in FIG. 9, the powder layer 53 is formed again on the powder layer 53 on which the first core member 33 is formed. Next, as shown in FIG. 10, the powder layer 53 is scanned by the laser 55 and the portion of the powder layer 53 that becomes the connecting portion 34 is irradiated with the laser 55.

Then, the portion of the powder layer 53 irradiated with the laser 55 is melted. As the melted portion of the powder layer 53 is solidified, the connecting portion shaping layer 56 is formed (the first shaping layer forming process).

After that, as the connecting portion shaping layers 56 are sequentially stacked (the second shaping layer forming process) by the same method as the above-mentioned method, the connecting portion 34 is formed. Further, the number of stacked connecting portion shaping layers 56 that constitute the connecting portion 34 of one layer may be appropriately changed.

Figure 11:
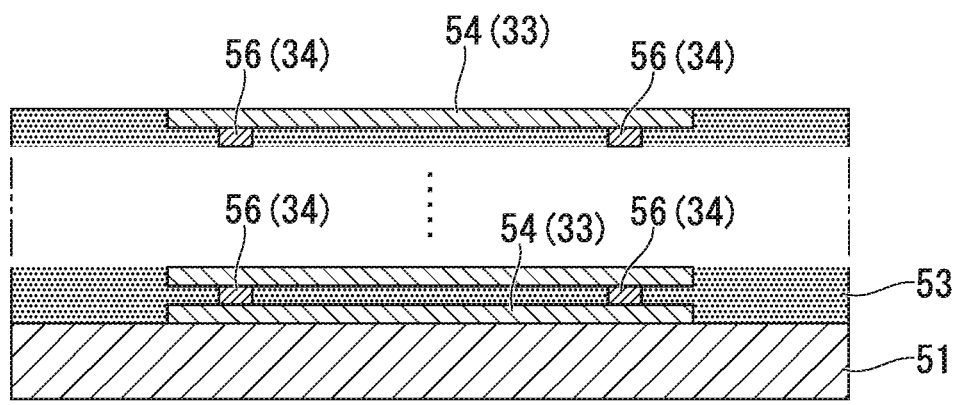
FIG. 11 is a process view showing the method of manufacturing the stator core according to the embodiment.

After that, as the above-mentioned core member forming process and connecting portion forming process are repeatedly performed, an exterior of the above-mentioned stator core 11 is formed as shown in FIG. 11.

Figure 12:
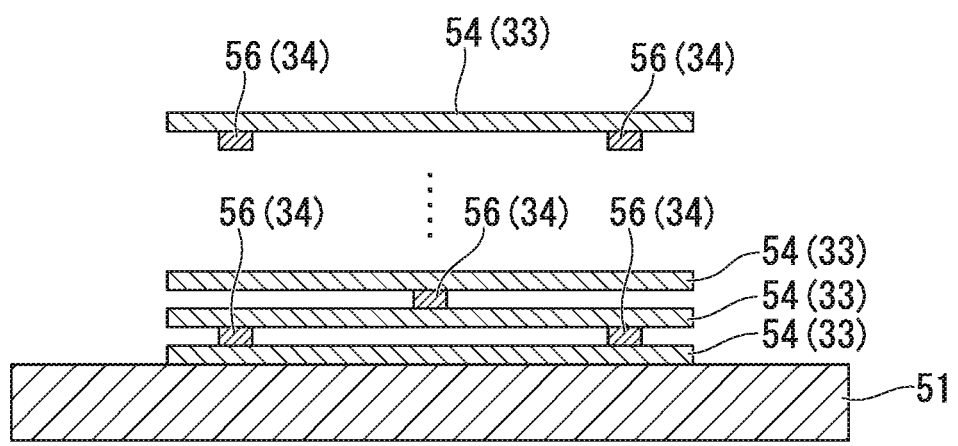
FIG. 12 is a process view showing the method of manufacturing the stator core according to the embodiment.

Next, the metal powder on the shaping tray 51 is removed as shown in FIG. 12, and the stator core 11 is taken out of the shaping tray 51. Accordingly, manufacture of the stator core 11 is terminated. While the configuration in which the shaping layers 54 and 56 are sequentially stacked in the axial direction has been described in the embodiment, the embodiment is not limited to the configuration. For example, a configuration in which the stator cores 11 are sequentially formed in the radial direction may be provided.

In this way, in the configuration of the embodiment, the stator core 11 is formed by stacking the plurality of shaping layers 54 and 56 in which the metal powder is solidified and formed.

According to the configuration, the embodiment is different from the configuration in which the core member is formed by punching an electromagnetic steel sheet like the related art, and a punching mold is unnecessary. For this reason, cost reduction and prompt delivery become possible.

Moreover, since the shaping layers 54 and 56 can be formed by melting and solidifying the metal powder, in comparison with the case in which the core member is formed by punching the electromagnetic steel sheet, a shape of the core member 33 can be freely designed. Accordingly, the degree of design freedom can be increased.

In the embodiment, since the shaping layers 54 and 56 can be formed by melting and solidifying the metal powder, the shaping layers 54 and 56 can be sequentially stacked while coupling the shaping layers 54 and 56. Accordingly, the embodiment is different from the case in which the core member is formed of the electromagnetic steel sheet, and there is no need to separately connect the core members (through caulking, adhesion, or the like). For this reason, further improvement of manufacturing efficiency can be achieved. Variation in the shape of the core members 33 can be suppressed in comparison with the case in which the core member is formed of the electromagnetic steel sheet. Accordingly, when the stator core 11 is manufactured, there is no need to stack the core members to prevent torque nonuniformity while transposing the core members. Accordingly, manufacturing efficiency of the stator core 11 can be further increased while suppressing torque nonuniformity. In the embodiment, there is no need to transpose the core members 33, and thus the number or an installation position of the attachment bosses 27 may be arbitrarily set. As a result, the degree of design freedom can be further increased.

In the configuration of the embodiment, the slits 31 passing through the stator core 11 in the axial direction are formed.

According to the configuration, current paths of eddy current generated in the stator core 11 by input and output of a magnetic flux due to rotation of the rotor 7 can be divided (insulated) by the slits 31. Accordingly, eddy current loss in the stator core 11 can be reduced. Accordingly, iron loss (a sum of eddy current loss and hysteresis loss) of the stator core 11 can be reduced.

In particular, in the embodiment, since the circumferential length P1 of the tooth piece 37 is set to the circumferential length P2 or more of the coil mounting portion 22A in which the slits 31 are not formed, it can be highly unlikely to make eddy current flow. As a result, a further reduction of eddy current loss can be achieved.

In the configuration of the embodiment, the core members 33 that are adjacent to each other in the axial direction are connected by the connecting portion 34 with the gap S provided therebetween.

According to the configuration, the current paths of the eddy current generated in the stator core 11 by input and output of magnetism due to rotation of the rotor 7 can be divided (insulated) by the gap S. That is, the eddy current can be suppressed from flowing throughout the core members 33 that are adjacent to each other in the axial direction. Accordingly, eddy current loss in the stator core 11 can be decreased.

In the configuration of the embodiment, the connecting portions 34 disposed at both sides in the axial direction of the core member 33 are set so as not to overlap each other when seen in the axial direction.

According to the configuration, for example, in comparison with the case in which the connecting portions that are adjacent to each other in the axial direction are formed at positions overlapping in a plan view, the current paths of the eddy current flowing to the core members 33 that are adjacent to each other through the connecting portion 34 can be lengthened. Accordingly, eddy current loss can be further decreased.

In the embodiment, since the stator core 11 may be formed of pure iron, hysteresis loss can be decreased in comparison with the case in which the stator core is manufactured of an electromagnetic steel sheet (a silicon steel sheet). Accordingly, the iron loss can be further reduced. Further, in the stator core 11 of the embodiment, a cross-sectional area (a cross-sectional area perpendicular to the radial direction) of the coil mounting portion 22 is decreased in comparison with the stator core in which the slits 31 formed in the silicon steel sheet are not provided. However, in the embodiment, as the stator core 11 is formed of pure iron as described above, a decrease in magnetic flux due to reduction in cross-sectional area can be compensated for. Accordingly, iron loss can be decreased while suppressing a decrease in motor efficiency (torque). Further, when a specified property (for example, high strength, corrosion resistance, chemical resistance, or the like) is necessary for the stator core 11, the stator core 11 is not limited to the pure core and may be formed of platinum.

In the embodiment, the core for a rotary electric machine according to the present invention has been employed in the stator core 11.

According to the configuration, for example, restrictions on manufacture such as strength or the like of the stator core 11 that is a non-rotating body are smaller than those of the rotor 7 that is a rotating body. For this reason, as the present invention is applied to the stator core 11, further improvement of a degree of design freedom or manufacturing efficiency can be achieved.

Moreover, in the embodiment, since the slits 31 are formed in the tooth portions 23 (the tooth pieces 37) having a high magnetic flux density, eddy current loss in the stator core 11 can be securely reduced.

Further, the technical range of the present invention is not limited to the above-mentioned embodiment, and various modifications of the above-mentioned embodiment may be made without departing from the spirit of the present invention.

While the example in which the core for a rotary electric machine of the present invention is applied to the stator core 11 has been described in the above-mentioned embodiment, the present invention may also be applied to the rotor core 8. The core for a rotary electric machine of the present invention may also be applied to both of the stator core 11 and the rotor core 8.

While the metal powder is solidified after the metal powder is melted and then cooled in the above-mentioned embodiment, the embodiment is not limited to the configuration and the metal powder may be sintered and solidified.

While the configuration in which the core members 33 are connected via the connecting portion 34 has been described in the embodiment, the core members 33 may also be directly connected to each other.

While the configuration in which the slits 31 are formed in the tooth portions 23 has been described in the above-mentioned embodiment, the embodiment is not limited to the configuration and the configuration in which the slits 31 are not formed may be provided. Slits may be formed in the back yoke portion 21.

Figure 13:
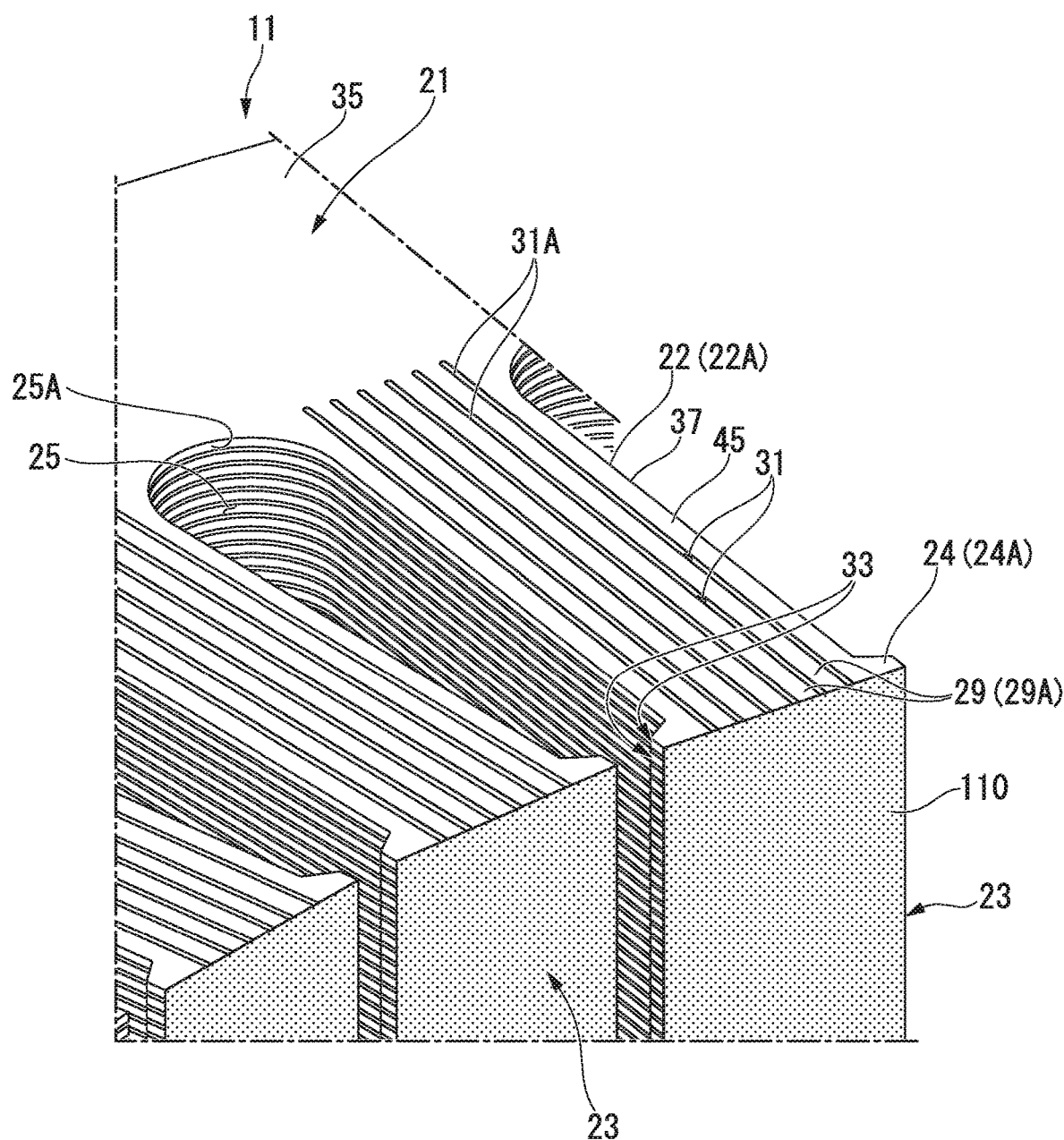
FIG. 13 is a perspective view showing a variant of the embodiment corresponding to FIG. 3.

Further, the slits 31 or the gap S may be used as a coolant passage of a coolant (air, cooling oil, or the like). In this case, since a contact area between the coolant and the stator core 11 can be increased in comparison with the case in which the slits 31 are not formed, cooling efficiency of the coil 13 can be improved. In this case, for example, as shown in FIG. 13, the inner end surfaces of the tooth portions 23 in the radial direction may be sealed by a sealing material 110 (for example, a resin or the like). Accordingly, leakage of a coolant from the inner end surfaces of the tooth portions 23 in the radial direction can be suppressed, and the coolant can be widely spread to the slits 31 or the gap S.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A core for a rotary electric machine comprising a stacked body where a plurality of shaping layers formed by solidifying a metal powder is integrally stacked,
   wherein the stacked body has:
   core members formed to follow an exterior shape of the stacked body when seen in a plan view in the stacking direction of the shaping layers; and
   connecting portions formed to be smaller than the exterior shape of the stacked body when seen in the plan view in the stacking direction and configured to integrally connect the core members in a state in which a gap is provided between the core members that are adjacent to each other.

2. The core for a rotary electric machine according to claim 1, wherein the connecting portions disposed at both sides in the stacking direction of the core member are set so as not to overlap each other when seen in the stacking direction.

3. The core for a rotary electric machine according to claim 1, wherein the metal powder is pure iron.

4. The core for a rotary electric machine according to claim 1, wherein the stacked body is a stator core.

5. The core for a rotary electric machine according to claim 4, wherein the stacked body has:
   a tubular back yoke portion; and
   tooth portions which protrude from the back yoke portion and on which a coil is mounted,
   wherein a plurality of slits passing through the back yoke portion in an axial direction is formed in the tooth portions at intervals in a circumferential direction of the back yoke portion.

6. A method of manufacturing a core for a rotary electric machine comprising repeatedly performing
   a first shaping layer forming process of forming a first shaping layer by solidifying a metal powder,
   a second shaping layer forming process of forming a second shaping layer on the first shaping layer by solidifying the metal powder supplied onto the first shaping layer, and
   forming a stacked body by integrally laminating the first shaping layer and the second shaping layer,
   wherein the stacked body has:
   core members formed to follow an exterior shape of the stacked body when seen in a plan view in the stacking direction of the shaping layers; and
   connecting portions formed to be smaller than the exterior shape of the stacked body when seen in the plan view in the stacking direction and configured to integrally connect the core members in a state in which a gap is provided between the core members that are adjacent to each other.

7. A core for a rotary electric machine comprising a stacked body where a plurality of shaping layers formed by solidifying a metal powder is integrally stacked,
   a slit passing through the stacked body in a stacking direction of the shaping layers is formed in the stacked body,
   wherein the stacked body has:
   core members formed to follow an exterior shape of the stacked body when seen in a plan view in the stacking direction of the shaping layers; and
   connecting portions formed to be smaller than the exterior shape of the stacked body when seen in the plan view in the stacking direction and configured to integrally connect the core members in a state in which a gap is provided between the core members that are adjacent to each other.

8. The core for a rotary electric machine according to claim 7, wherein the metal powder is pure iron.

9. The core for a rotary electric machine according to claim 7, wherein the stacked body is a stator core.

10. The core for a rotary electric machine according to claim 9, wherein the stacked body has:
    a tubular back yoke portion; and
    tooth portions which protrude from the back yoke portion and on which a coil is mounted,
    wherein a plurality of slits passing through the back yoke portion in an axial direction is formed in the tooth portions at intervals in a circumferential direction of the back yoke portion.

11. A core for a rotary electric machine comprising a stacked body where a plurality of shaping layers formed by solidifying a metal powder is integrally stacked,
    wherein the stacked body has:

core members formed to follow an exterior shape of the stacked body when seen in a plan view in the stacking direction of the shaping layers; and connecting portions formed to be smaller than the exterior shape of the stacked body when seen in the plan view in the stacking direction and configured to integrally connect the core members in a state in which a gap is provided between the core members that are adjacent to each other, wherein the connecting portions disposed at both sides in the stacking direction of the core member are set so as not to overlap each other when seen in the stacking direction.

12. The core for a rotary electric machine according to claim 11, wherein the metal powder is pure iron.

13. The core for a rotary electric machine according to claim 11, wherein the stacked body is a stator core.

14. The core for a rotary electric machine according to claim 13, wherein the stacked body has:

a tubular back yoke portion; and tooth portions which protrude from the back yoke portion and on which a coil is mounted, wherein a plurality of slits passing through the back yoke portion in an axial direction is formed in the tooth portions at intervals in a circumferential direction of the back yoke portion.

* * * * *